(12) United States Patent
Peterson et al.

(10) Patent No.: US 7,104,504 B2
(45) Date of Patent: Sep. 12, 2006

(54) INFLATABLE WING WITH ACTIVE CANOPY PROFILE CONTROL

(76) Inventors: Alex Peterson, 1985 Kennedy, Long Lake, MN (US) 55356; Aaron Sales, 1022 Country Club Rd., Hood River, OR (US) 97031; Tony Logosz, 1413 A St., Hood River, OR (US) 97031

( * ) Notice: Subject to any disclaimer, the term of this patent is extended or adjusted under 35 U.S.C. 154(b) by 0 days.

(21) Appl. No.: 10/949,696

(22) Filed: Sep. 24, 2004

(65) Prior Publication Data

US 2006/0065787 A1 Mar. 30, 2006

(51) Int. Cl.
*B64D 17/34* (2006.01)
(52) U.S. Cl. ........................ 244/152; 244/902
(58) Field of Classification Search ..... 244/153 R–155 A, 900, 902, 903; 114/39.12, 39.13, 139.16, 114/102.1, 102.11, 102.12, 102.22; 280/810; 441/73
See application file for complete search history.

(56) References Cited

U.S. PATENT DOCUMENTS

| | | | | | |
|---|---|---|---|---|---|
| 3,393,885 | A | * | 7/1968 | Neumark | 244/145 |
| 3,945,592 | A | * | 3/1976 | Sutton | 244/152 |
| 4,813,636 | A | * | 3/1989 | Lindgren | 244/152 |
| 4,846,423 | A | * | 7/1989 | Reuter | 244/145 |
| 6,514,115 | B1 | * | 2/2003 | Harich | 446/34 |
| 6,837,463 | B1 | * | 1/2005 | Lynn | 244/146 |
| 6,869,047 | B1 | * | 3/2005 | Pouchkarev | 244/155 A |
| 2002/0185570 | A1 | * | 12/2002 | Winner | 244/155 A |
| 2003/0154898 | A1 | * | 8/2003 | Lagaignoux | 114/102.1 |
| 2005/0133669 | A1 | * | 6/2005 | Royannais et al. | 244/155 A |

\* cited by examiner

*Primary Examiner*—Galen Barefoot (57) ABSTRACT

An aerodynamic wing formed by a flexible canopy with an internally routed canopy line for controlling the canopy profile. Preferably, the canopy line is routed through a gatherable tube secured to the trailing edge of the canopy. Tensioning the canopy line alters the canopy profile to facilitate launching the kite.

16 Claims, 7 Drawing Sheets

INFLATABLE WING WITH ACTIVE CANOPY PROFILE CONTROL

FIELD OF THE PRESENT INVENTION

The present invention relates generally to inflatable power or traction kites. More particularly, the invention relates to an inflatable kite having a canopy profile that can be actively controlled.

BACKGROUND OF THE INVENTION

Recently, considerable effort is being expended to develop wings capable of generating tractive force for the purposes of powering a user on a variety of vehicles that are tethered solely by flexible lines. Such wings can generally be considered kites. The development of kites capable of generating significant force has made possible numerous recreational pursuits. For example, kite surfing or kite boarding refers to a sport involving the use of a wind powered wing to pull the participant on a vehicle across a body of water. Similar sports involving the use of appropriately configured vehicles to traverse sand, earth, snow and ice are also being pursued. One of skill in the art will also recognize that wind powered wings can be used in any number of other applications, whether recreational or practical. With the development of these applications has come an increasing demand for kites having improved characteristics.

One type of kite that has achieved popularity is a leading edge inflatable ("LEI") kite, typically comprising a semi-rigid framework of inflatable struts or spars that support a canopy to form the profile of the wing. This basic design is taught by U.S. Pat. No. 4,708,078 to Legaignoux, et al. The development of the LEI kite is generally credited with spurring the development of modern kite surfing due to its ability to be relaunched from the water's surface.

Despite the success of LEI kite designs, they do present certain, inherent challenges. As one having skill in the art appreciates, the airfoil presented by the canopy of the kite determines how the kite will perform. Particularly important characteristics include performance, handling, efficiency, relaunchability and power control, most of which are interrelated. Unfortunately, improving one aspect of a given airfoil often degrades performance in other areas. For example, attempts to improve the performance of a kite by increasing the aspect ratio of the wing typically makes the kite more difficult to relaunch. Similarly, one aspect of a kite's efficiency is its lift to drag ratio, but increasing this ratio can have adverse effects on the handling of the kite. Thus, obtaining a desirable balance of characteristics can be difficult.

A related issue is that different characteristics may be desirable for different users or under different conditions. For example, more advanced users may desire a kite with a higher aspect ratio, which can offer greater efficiency but will require more sensitive control and will be more susceptible to changes in wind velocity and direction. In contrast, more novice users often use a kite having lower aspect ratio, which is generally more forgiving to variations in wind and does not demand as precise input from the user. As another example, users looking for the best performance when jumping often seek kites having an airfoil that exhibits high efficiency. On the other hand, users primarily kiting in wave conditions often seek kites that generate relatively constant and uniform power. Given these observations, it would clearly be desirable to utilize a kite having characteristics that could be tuned to fit the conditions or the type of performance desired by the user.

Conventional kites controlled by four lines do offer the ability to tune the kite's performance in one manner. By changing the length of the front lines with respect to the back lines, the user can adjust the angle of attack of the kite's airfoil. However, this type of trim control does not offer any means for controlling the canopy's profile. Thus, these prior art systems do not offer a method for altering the characteristics of the canopy's airfoil.

Yet another aspect of kite design is related to the ability to launch or relaunch the kite. As discussed above, kites having relatively high aspect ratios can be difficult to relaunch. However, the problems associated with relaunching a kite are exacerbated when the kite is used on a relatively low friction surface, such as sand, snow and ice. Indeed, relaunching a conventional four-line kite on snow, regardless of aspect ratio, is extremely difficult and usually requires the use of a fifth line attached to the trailing edge of the kite. Thus, improving the relaunchability of a kite generally either constrains the aspect ratio or requires additional design elements.

Prior art attempts to add design elements to improve the relaunchability of kites have not been completely successful. For example, U.S. Pat. No. 6,659,031 to LeGaignoux describes a bridle arrangement for a four-line kite that is able to apply tension to the trailing edge to aid relaunching. However, the bridle system generally decreases the responsiveness of the kite to turning input. Another attempt is disclosed in WO 03/101824 which uses a stopper arrangement to transmit power to a line attached to the trailing edge. However, the stopper arrangement requires a relatively complex interconnection, which is subject to fouling. Further, both of these prior art methods involve the use of an external line at the trailing edge which can catch on foreign objects, presenting a significant safety problem, and also creates durability and convenience issues while increasing air resistance.

Accordingly, it is an object of the invention to provide a system and method for optimizing the performance of a power kite for different situations and conditions.

It is also an object of the invention to provide a system and method for improving the launchability of a power kite.

It is a further object of the invention to provide a system and method for dynamically controlling the canopy profile.

SUMMARY OF THE INVENTION

In accordance with the above objects and those that will be mentioned and will become apparent below, the present invention is an aerodynamic wing with a leading edge, a trailing edge, a flexible canopy forming a lifting surface, and an internally routed canopy line secured to the canopy so that changing the tension of the canopy line alters the lifting surface. Preferably, the internally routed canopy line comprises at least one gatherable tube secured to the canopy, wherein the canopy line is slidably disposed within the tube.

In a first embodiment, the gatherable tube is disposed adjacent the trailing edge of the aerodynamic wing. The canopy line is secured at a distal point along the trailing edge. When tension is applied to the canopy line, the gatherable tube is compressed, gathering the portion of the trailing edge canopy secured to the gatherable tube.

The invention also comprises a method of controlling an aerodynamic wing including the step of providing an internally routed canopy line secured to the canopy and altering tension of the canopy line to control the profile of the canopy.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

The present invention is an aerodynamic wing having a lifting surface with a leading edge, a trailing edge, and a flexible canopy that substantially forms a lifting surface. With reference to presently preferred embodiments, canopy is used to describe the material that forms the majority of a wing used in a lifting application, such as a parachute, hang glider or kite. Thus, canopy is used to refer to any relatively flexible material capable of presenting a shape that generates lift due to its aerodynamic characteristics, such as the body of a sail, and the like. A canopy control line is routed internally through at least a portion of the canopy and secured at a point on the canopy, so that changing the tension of the canopy line alters the canopy configuration.

In a presently preferred embodiment, the internal routing comprises a gatherable tube formed from flexible material secured to the portion of the canopy. The canopy line is disposed within the gatherable tube. Tensioning the canopy line causes the tube to gather, together with the portion of the canopy secured to it. Thus, this allows the canopy profile to be controlled to exhibit different aerodynamic characteristics. Generally, depending upon the design parameters, changing the tension on the control line imparts a specific modification to the profile of the canopy, altering any desired aerodynamic characteristic of the wing, such as its efficiency, angle of attack, lifting coefficient, handling, responsiveness and the like.

Internal routing, as used herein, generally refers to a flexible line of which a portion travels through the lumen of an enclosing structure that is attached to the canopy. However, in situations where the aerodynamic wing defines some significant internal volume, the control line can be simply routed within that volume. For example, in a foil style kite with top and bottom lifting surfaces, some portion of the control line can be internally between those surfaces, so that it is slidably attached and fixedly attached, to at least one point of the canopy each, so that tensioning the line alters the aerodynamic wing. Alternatively, the canopy control line can be routed internally through some existing volume of a different kite configuration. For example, in a LEI kite, the control line can be internally routed through one or more of the kite bladders. Those having skill in the art will recognize that in other applications, other aerodynamic wing configurations offer different, equally suitable, internal routing options. Additionally, although this invention capitalizes on the use of an internally routed canopy control line, an external line could be used in addition to the internal line.

Figure 1:
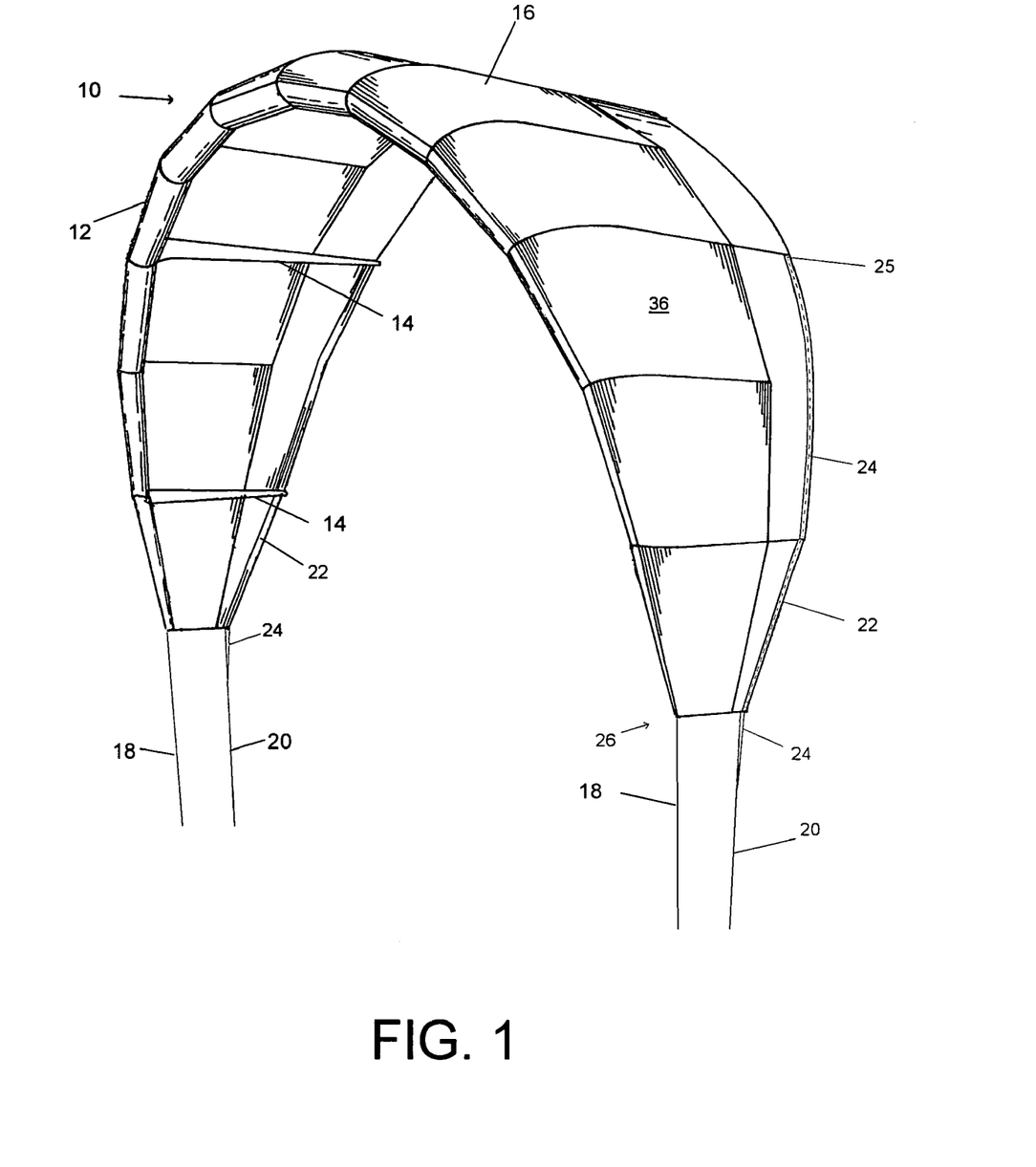
FIG. 1 is a perspective view of a kite embodying features of the invention showing canopy control at the trailing edge.

Turning to FIG. 1, an inflatable leading edge (LEI) kite 10 is shown that embodies features of the invention. As can be seen, kite 10 is generally in the shape of an arc and comprises an inflatable strut 12 that forms the leading edge of kite 10. A plurality of rib inflatable struts 14 are aligned transversely with leading edge strut 12. A canopy 16 is secured to the top of the framework created by struts 12 and 14. Control lines 18 and 20 are attached to the tips of kite 10. Kite 10 as shown comprises a conventional four-line kite that generally utilizes front lines 18 to transmit power from kite 10 and back lines 20 to transmit steering forces. The amount of power generated by kite 10 at a given wind speed can be controlled by altering the length of front lines 18 relative to back lines 20. This effectively changes the angle of attack of kite 10 by either sheeting in or sheeting out.

Gatherable tube 22 is secured to canopy 16 at a desired location. As shown in FIG. 1, gatherable tube 22 is located adjacent the trailing edge of canopy 16. In other embodiments, as described below, the gatherable tube can be located at other areas of the canopy or in different orientations to achieve differing types of control over the canopy profile. Further, more than one gatherable tube can be employed if desired. Preferably, a gatherable tube 22 is located at each side of kite 10. A canopy line 24 is slidably disposed within tube 22 and secured at a distal point 25.

Figure 2:
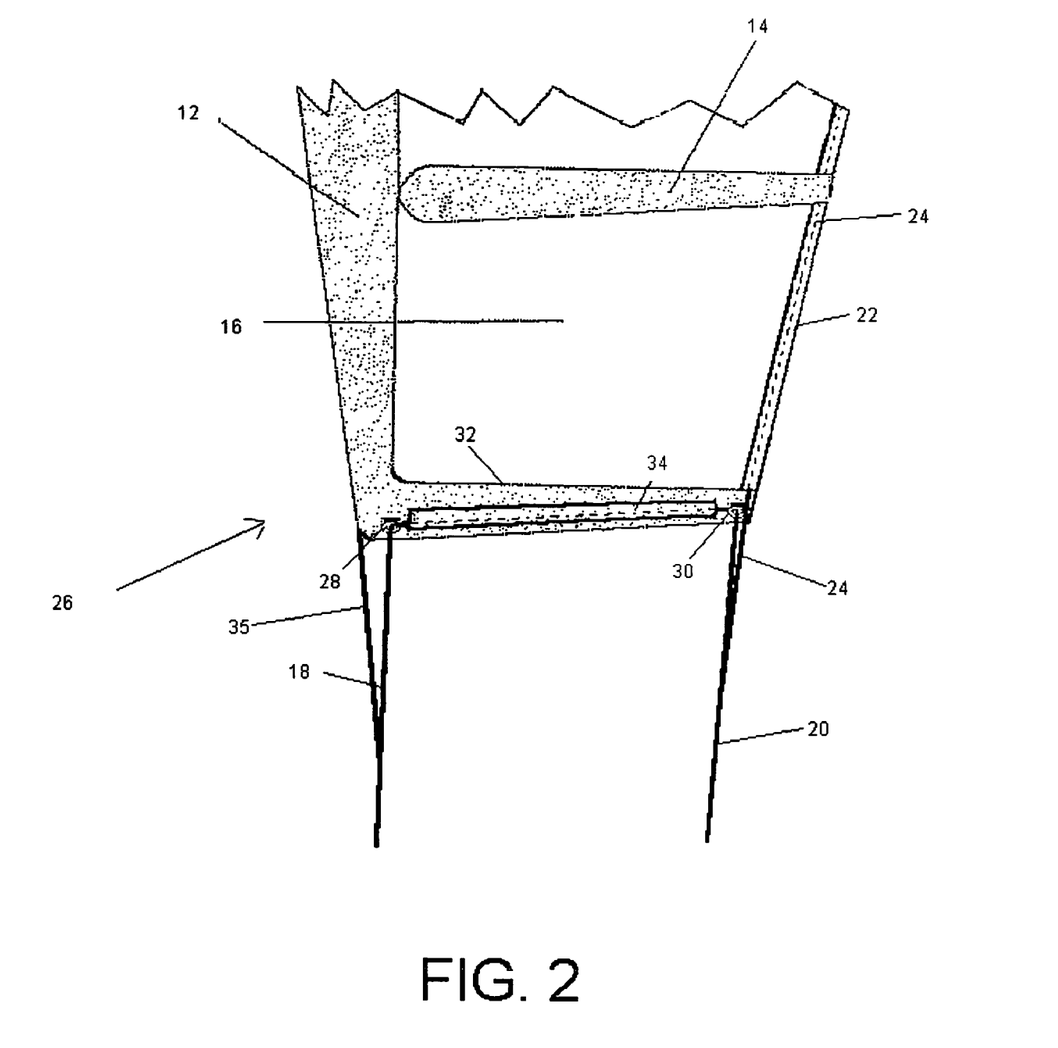
FIG. 2 is a detail view of a wing tip of the kite shown in FIG. 1.

FIG. 2 shows one embodiment of the invention wherein tension can be applied to canopy line 24 using a four-line control system. As described above, control lines 18 are the front lines and control lines 20 are the back lines. The detail view shown is of wingtip 26 of kite 10 adjacent gatherable tube 22. Generally, front line 18 and back line 20 are connected to each other and secured to kite 10 at a front slide point 28 and rear slide point 30. Preferably, wingtip 26 is equipped with a stiffening element 32 that prevents the wingtip from deforming when tension is applied to control lines 18 and 20. Control lines 18 and 20 can be routed internally through conduit 34. Canopy line 24 is attached to back line 20 at point 32. As can be seen, when control line 20 is pulled away from kite 10, tension will be transmitted to canopy line 24 as soon as any slack is taken up.

In use, pigtail extension 35 transmits normal front line tension to the leading edge of kite 10 when the kite is flying, locking in the front line power. When tension is removed from the front lines 18, for example when the kite is leading edge down prior to launching, tension can be applied to backline 20. Pigtail extension 35 allows the front line 18 to decouple, and slide through slide points 28 and 30. In turn, this allows canopy line 24 to be tensioned. When tension is applied to canopy line 24, it gathers tube 22 and, consequently, that portion of the canopy 16 that is attached to tube 22. This causes the profile of canopy 16 to be actively changed. In the shown embodiment, one effect of this profile change is that launching kite 10 from a position where the leading edge is face down. Thus, when a user is seeking to launch kite 10 from this position, rear line 20 simply needs to be pulled until sufficient tension is transmitted to canopy line 24 to gather tube 22 and the secured portion of canopy 16, changing the canopy profile to facilitate launching or relaunching.

In addition to assisting launching, locating the gatherable tube 22 at the trailing edge also allows the kite designer to impart control over other aspects of the canopy's performance. For example, gathering the canopy at the trailing edge can cause kite 10 to fly backwards, trailing edge first. This is related to the launch assist characteristics, but can have other benefits as well. Additionally, locating the gatherable portion of the canopy adjacent the wingtips can decrease the turning radius of kite 10, thus improving steering. Further, canopy control at the trailing edge can also be used to achieve trim control and aid in orienting the kite.

As known in the art, canopy 16 typically comprises multiple panels 36, each of which has a specific shape. When the shaped panels are sewn together, the two-dimensional canopy material can take on a three-dimensional profile. Panel materials can be any suitable planar, flexible materials including cotton, paper, plastics, such as polyesters, Mylar, Teijin, Dacron, polyurethane, vinyl, and/or nylon, other fabrics, and the like. A presently preferred material is a rip stop high tenacity polyester fabric. Canopy surface 16 is secured to inflatable struts 12 and 14 to describe a three-dimensional profile, particularly when struts 12 and 14 are inflated. In many embodiments, the struts in a LEI kite comprise a casing made of materials similar to canopy panel materials, but generally higher strength. The casing is responsible for imparting shape and strength to the strut, but is not necessarily sufficiently air-tight. In such cases, a relatively air-tight bladder (not shown) that upon inflation expands within the casing to support and define the structure. Suitable bladder materials include polyethylene, rubbers, latex, and the like.

Gatherable tube 22 can be constructed using any suitable technique, but preferably comprises a portion of material similar to the canopy that is sewn or otherwise secured to form a longitudinal channel that allows canopy line 24 to slide within. Alternately, gatherable tube 22 and/or the portion of canopy 16 subject to control can be formed from compliant material. By using such material, it is possible to avoid introducing wrinkles in the canopy or tube when applying tension to canopy line 24. In use, the compliant material is expanded when the struts and leading edge are inflated and the kite is subjected to wind loading. Applying tension to canopy line 24 can then return the material to its relaxed state, imparting the desired control of the canopy configuration. Indeed, the use of compliant material biases the configuration to its contracted state and thus reduces the amount of tension necessary to produce a given change in configuration with respect to the use of non-compliant materials. Further, the term "gatherable," includes accordian-like folding and any form of compression whereby the tube changes from a first extended length to a relatively shorter length. For example, gatherable tube can be formed from a mesh having a weave that tightens as the tube is shortened under tension from the canopy line.

Significantly, the internal routing of canopy line 24, such as through gatherable tube 22, protects the canopy line from tangling or catching on foreign bodies. This yields significant safety and durability benefits. The internal routing also decreases the air resistance, improving the kite's overall performance.

Further, as can be appreciated, canopy line 24 exerts control over canopy configuration from its first point of sliding attachment to the point of fixed attachment. In its most fundamental aspect, tension applied to the canopy line tends to bring together the first point of sliding attachment and the point of fixed attachment. If there is a substantial distance between these points, there may be an undesirable lack of control over the canopy material in this area. This can be improved by adding additional sliding points of attachment between the first point and the fixed attachment, and routing the canopy line through them. The gatherable tube 22 of the invention offers the greatest level of control, by effectively creating a continuous sliding point of attachment along the entire length of the tube that is secured to the canopy material. Thus, the canopy material is controlled by the gatherable tube in conjunction with the canopy line.

Slide points 28 and 30 can be rings, line loops, pulleys, or any similar apparatus that allows lines 18 and 20 to slidably move at a fixed point on wingtip 26. Stiffening element 32 can be any component more rigid than the canopy material, but preferably is substantially more rigid so as to prevent the canopy configuration from being altered by changing tension on canopy line 24 in this area. Instead, tension is transmitted to gatherable tube 24 where alteration of canopy configuration is desired. As shown in FIG. 2, stiffening element 32 comprises an inflatable strut, either separately inflatable or in communication with leading edge strut 12. Alternatively, it may comprise a solid or tubular batten, constructed from fiberglass, carbon, composite polymeric, metal, natural or synthetic materials.

In embodiments comprising a tubular stiffening element 32, control lines 18 and 20 can be routed through the element. Canopy line 24 can be formed from any suitable material and is preferably low friction. A presently preferred material is Spectra. In the shown embodiment, canopy line 24 is relatively non-compliant, however, in other applications, it may be desirable for canopy line 24 to have a certain degree of elasticity. Canopy line 24 may also have a relatively round cross section or may be configured as a tape or ribbon. Further, front line 18 and rear line 20 are discussed as separate elements to clarify their function by analogy to conventional four-line kite systems. As such, they may be referred to as being secured or attached to each other, either directly or via a line extension as discussed below. However, these elements can be formed from a single, continuous piece of line as desired and the description of two or more line elements attached or secured together can therefore include multiple portions of the same line.

The shape of canopy 16 is thus dictated by shaped panels 34, struts 12 and 14, the dynamic loads of wind on the canopy 16 when kite 10 is in flight, and any tension on canopy line 24 that contributes to the conformation of the canopy profile. This shape generally forms the upper surface of a lift-producing aerodynamic wing, the lifting surface. As such, it has a number of attributes, including the leading edge, the trailing edge, and a chord line that connects the leading edge to the trailing edge. The chord line of the wing with respect to horizontal determines the angle of attack (AoA). Kite 10 also has a camber, determined by the curvature of canopy 16. The coefficient of lift for a given wing depends upon its camber. Further, the aspect ratio of kite 10 is determined by dividing the span of the kite by its chord width.

As one having skill in the art can appreciate, securing gatherable tube 22 to different portions of canopy 16 in different orientations allow kite 10 to be designed so that tension on canopy line 24 affects specific aspects of airfoil created by canopy 16.

Figure 3:
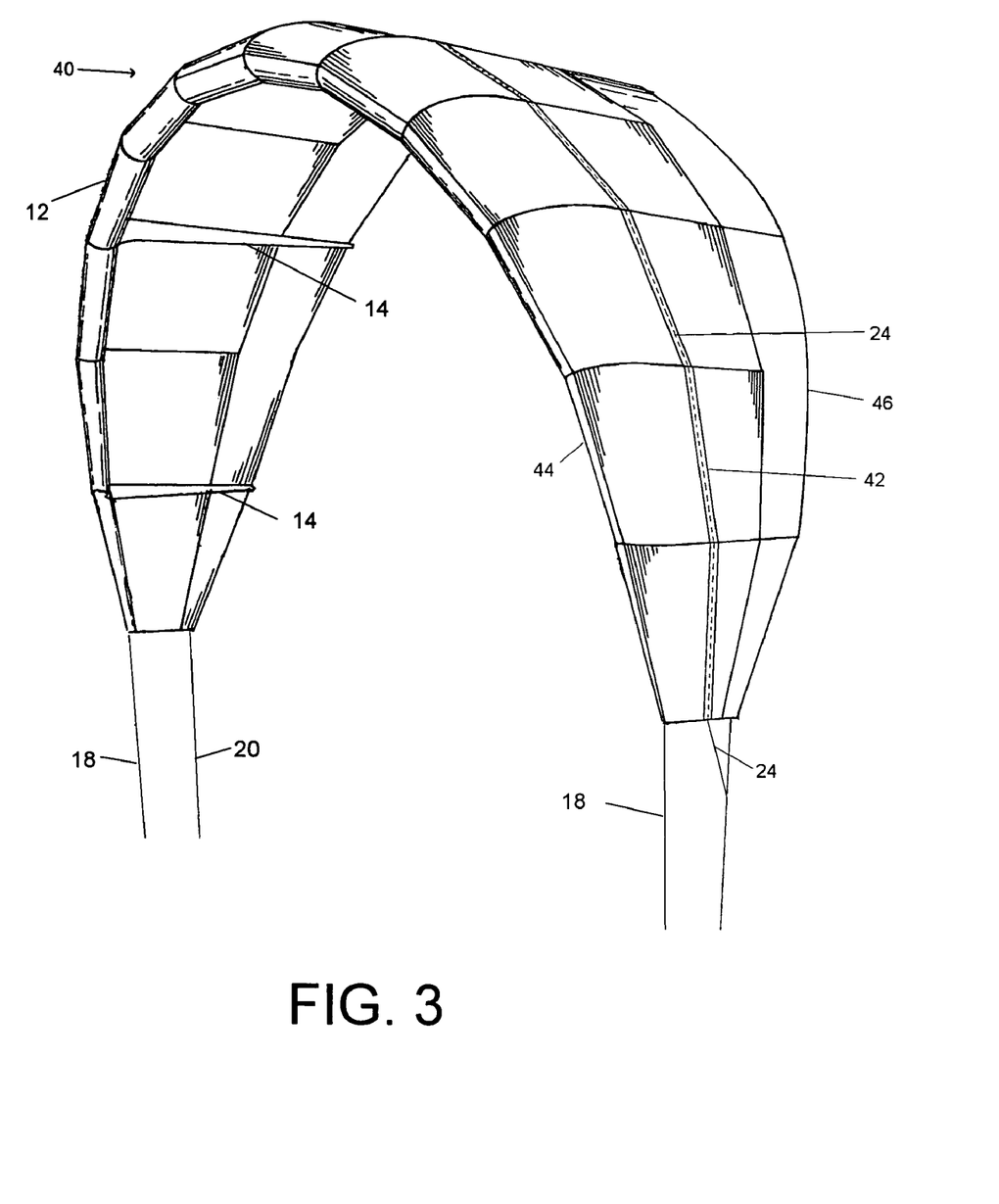
FIG. 3 is a perspective view of an alternative embodiment of the invention showing the canopy control at mid span.
Figure 4:
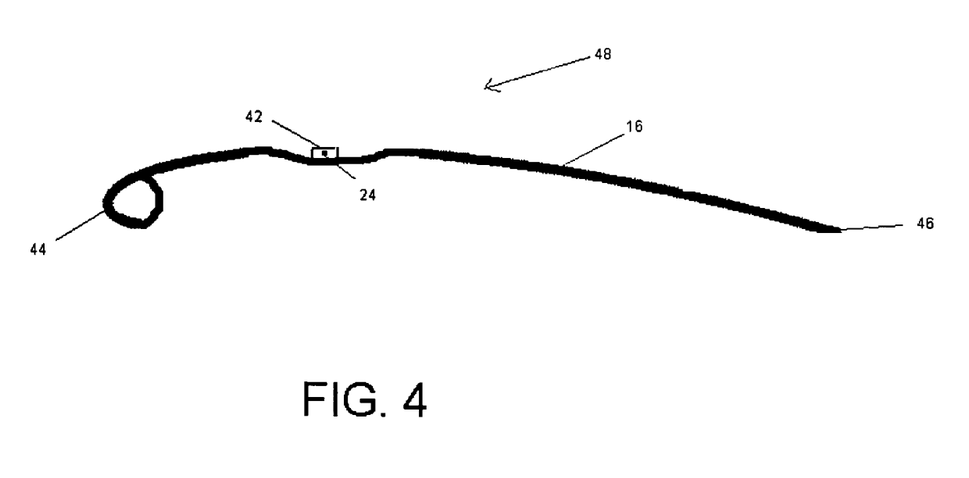
FIG. 4 is a cross sectional view of the airfoil of the kite shown in FIG. 3.

For example, in the embodiment shown in FIG. 3, kite 40 is equipped with a gatherable tube 42 located between the trailing edge 44 and the leading edge 46. Tension on canopy line 24 can therefore modify the airfoil profile. FIG. 4 shows a cross section of the airfoil 48 created by kite 40. Tension on canopy line 24 has caused the airfoil to deflect as shown. This deflection can cause the air flow to reattach, effectively lowering the stall speed. Alternatively, positioning canopy line closer to the leading edge allows the kite to be designed so that changing tension on the line alters the curvature of the leading edge. As can be seen, tightening the arc described by the leading edge serves to alter the projected area of the kite, which generally reduces the lifting power.

Figure 5:
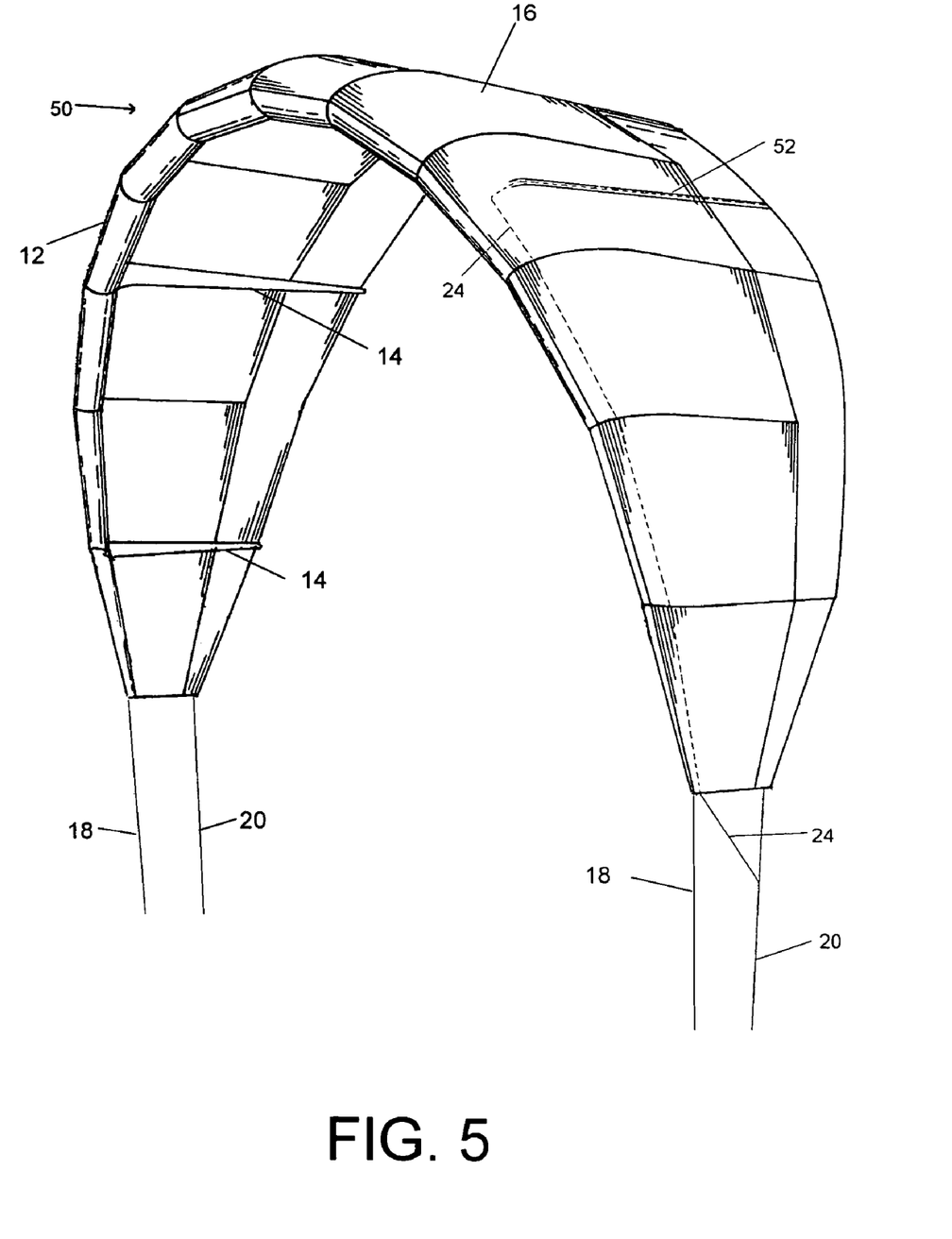
FIG. 5 is a perspective view of an alternative embodiment of the invention showing the canopy control oriented perpendicularly to the leading edge.

In another embodiment of the invention, such as that shown in FIG. 5, a kite 50 has a gatherable tube 52 secured to canopy 16 that is oriented substantially perpendicularly to the leading edge. Applying tension to canopy line 24 causes gatherable tube 52 to compress. Preferably, routing canopy line 24 next to leading edge 12 serves to transmit tension to gatherable tube 52. This causes the profile of canopy 16 to become relatively flatter.

Figure 6:
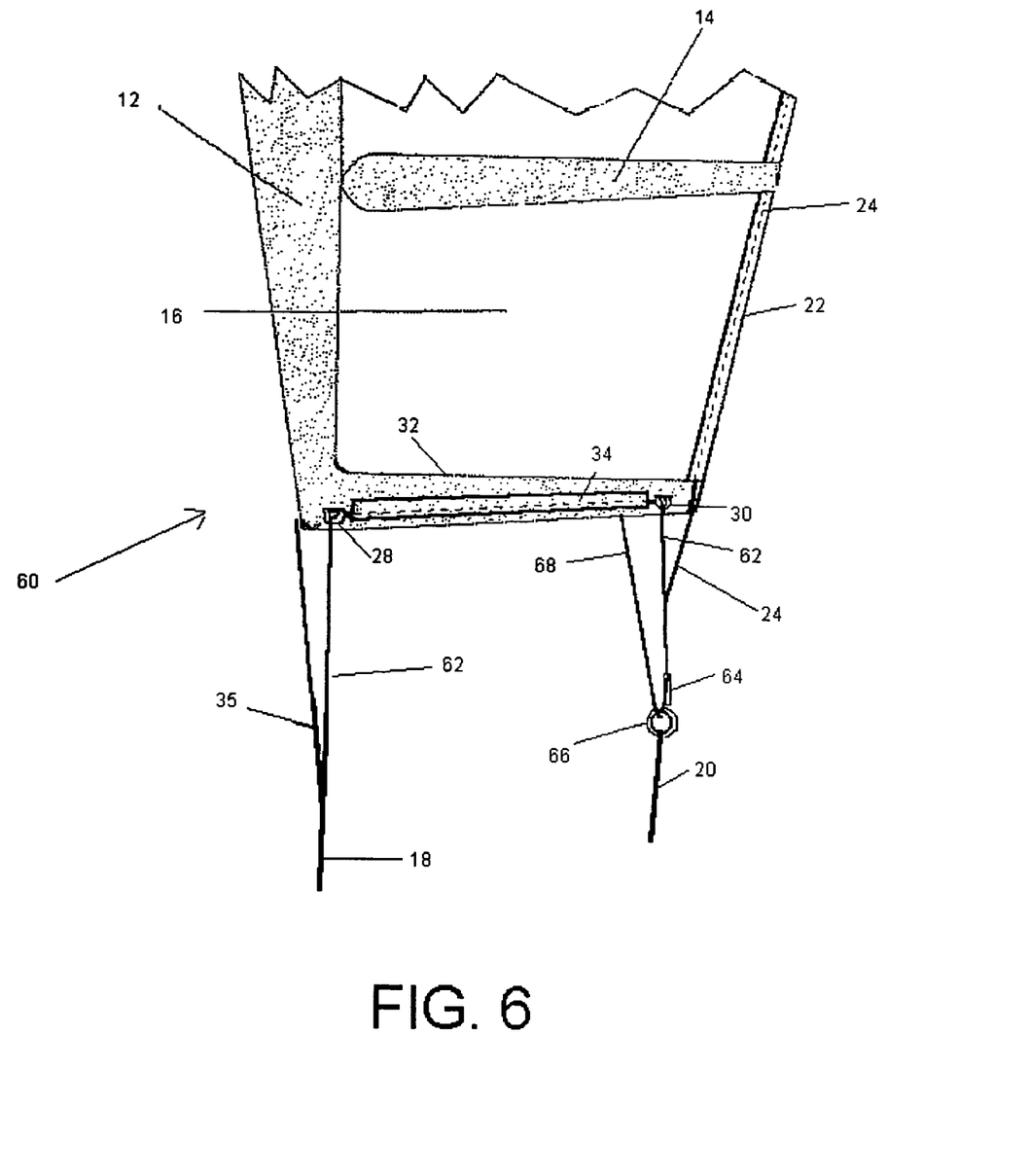
FIG. 6 is a detail view of a wing tip of a kite of the invention showing an alternate system for altering canopy line tension.

Another aspect of the invention is shown in FIG. 6, which provides a detail view of a wing tip having features of the invention. In the shown embodiment, tension can be applied to canopy line 24 using a conventional four-line control system. Control lines 18 are the front lines and control lines 20 are the back lines. A wingtip 60 of a kite of the invention has gatherable tube 22 adjacent the trailing edge. Generally, front line 18 is attached to pigtail extension 35 and line extension 62. Line extension is sequentially routed through front slide point 28, conduit 34, rear slide point 30 and attached to locking element 64. Locking element 64 is attached in turn to pigtail extension 68, which is then routed through locking slide point 66 and then secured to the canopy at the wing tip. Slide point 66 is preferably a stainless steel ring or the like. Canopy line 24 is attached to line extension 62 at a point between rear slide point 30 and locking slide point 66, or alternatively, to locking element 64. Preferably, wingtip 26 is equipped with a stiffening element 32 that prevents the wingtip from deforming when tension is applied to control lines 18 and 20 and line extension 62. Locking element 64 has a length to width ratio that allows it to pass through slide point 66 when there is relatively little tension on line extension 62, but will not pass through slide point 66 when front line 18 exerts relatively greater tension on extension 62.

Thus, in use, when the kite is flying, there is a normal amount of tension on front line 18 which is consequently transferred to line extension 62 to prevent locking element 66 from passing through slide point 64. This locks control of front line 18 and rear line 20, by preventing line extension 62 from sliding through slide point 64. In turn, when there is relatively little tension on front line 18, such as when the kite is leading edge down on a surface and ready for launching, locking element 66 can pass through slide point 64, allowing tension to be applied to canopy line 24.

As can be appreciated, a system utilizing locking element 66 and locking slide point 64 prevents unintended movement of line extension 62, keeping the relative length of front and rear lines 18 and 20 fixed during normal use. This allows the user to exert maximum control over the attitude of the kite. The locking element could also be located at other suitable locations, where tension on the line would restrict passage of the locking element, such as adjacent front slide point 28 or rear slide point 30. Alternatively, it can be desirable to omit such locking features to allow subtle changes in the relative effective length of front line 18 and rear line 20. A properly configured kite with this design presents improved self-trimming characteristics.

Figure 7:
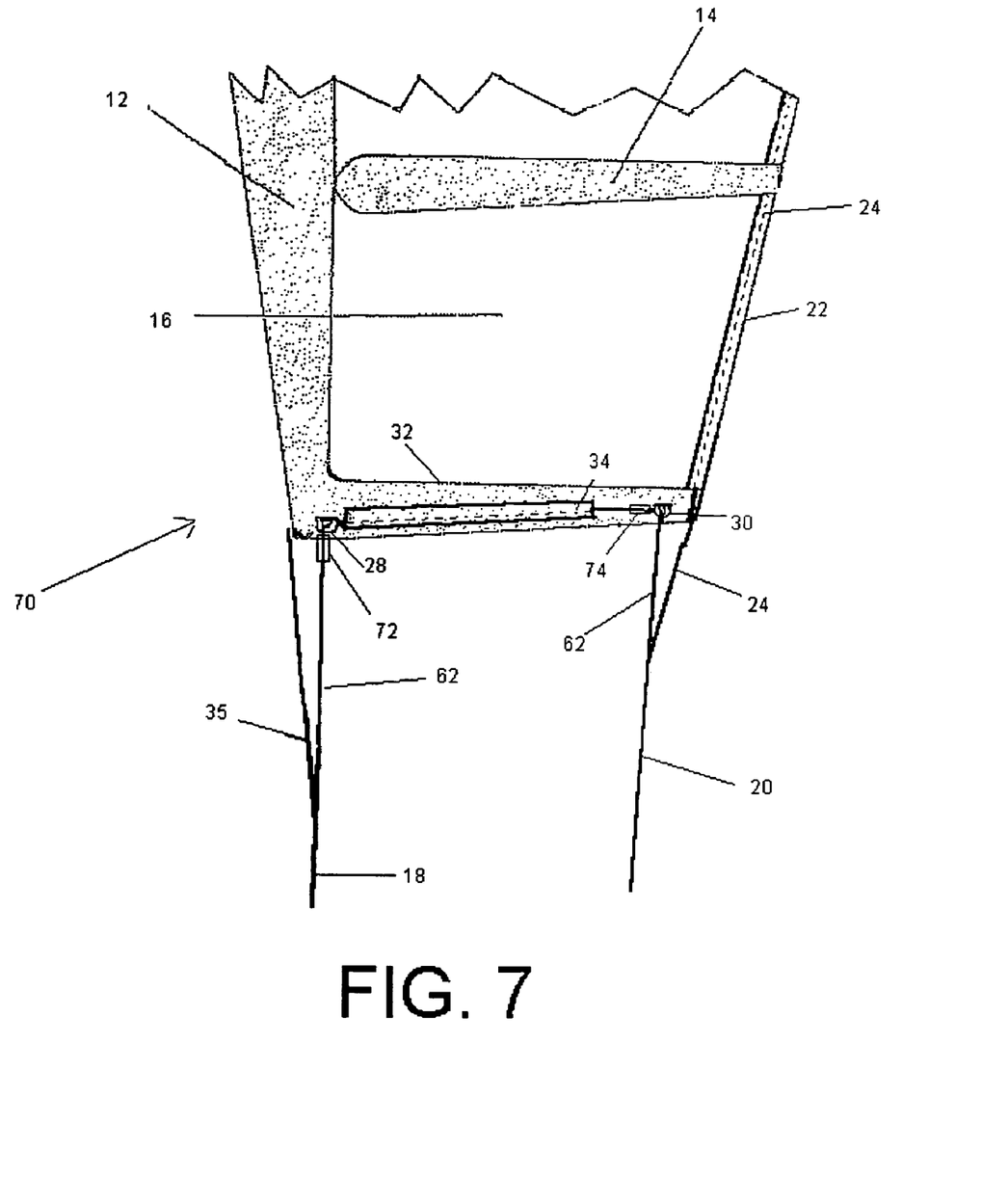
FIG. 7 is a detail view of an alternative wing tip of a kite of the invention showing different locking element embodiments.

FIG. 7 shows alternative embodiments of the invention that also employ a locking element. In these embodiments, tension is applied to canopy line 24 using a conventional four-line control system. Control lines 18 are the front lines and control lines 20 are the back lines. A wingtip 70 of a kite of the invention has gatherable tube 22 adjacent the trailing edge. Generally, front line 18 is attached to pigtail extension 35 and line extension 62. Line extension is sequentially routed through front slide point 28, conduit 34, rear slide point 30 and attached to rear line 20. Two alternative positions of a locking element are shown adjacent either front slide point 28 or rear slide point 30 by locking element 72 or locking element 74, respectively. Canopy line 24 is attached either to line extension 62 at a point after it passes through rear slide point 30 or to rear line 20. Locking element 64 has a length to width ratio that allows it to pass through front slide point 28 or rear slide point 30 when there is relatively little tension on line extension 62, but will not pass through the slide points when there is relatively greater tension on extension 62. Wingtip 26 can be equipped with a stiffening element 32 that prevents the wingtip from deforming when tension is applied to control lines 18 and 20 and line extension 62. The need for stiffening element 32 is reduced or eliminated in embodiments employing a locking element 74 adjacent the rear slide point 30.

In yet another embodiment of the invention, a kite can have a plurality of gatherable tubes. For example, a single canopy line can be split into the requisite number of branches to apply tension to and consequently gather each tube. Alternatively, separate canopy lines could be used to provide separate control over the configuration of the canopy at each location of the gatherable tubes. In yet another embodiment of the invention, a single canopy line could be split into branches that were then subject to varying degrees of mechanical advantage so that varying amounts of tension could be applied to different gatherable tubes as desired. Such varying mechanical advantage can be achieved by using pulley arrangements, block and tackles, or the like, on some of the branches. Further, decreasing the area of the canopy secured to each gatherable tube increases the relative change in canopy configuration for a given amount of gathering.

A number of the embodiments discussed above concern the use of a canopy line having a tension that can be actively changed while the kite is flying. For example, in the disclosed embodiments, control over the canopy line is piggy-backed on one of the existing control lines. Thus, the control lines are able to both fly the kite normally as well as change tension on the canopy line. Alternatively, the canopy line can be controlled by a dedicated line, such as by extending it to the control bar, where it can be tensioned separately from control lines 18 and 20. One having skill in the art will also recognize that a number of alternate suitable means can be employed to apply tension to the canopy lines. However, those having skill in the art will appreciate that a system of manual control over the canopy line tension is also suitable for practice of the invention. For example, the canopy line tension can be adjusted before the kite is launched to optimize its characteristics for the given conditions by a manual tension adjuster. The desired tension can be held by securing the end of the canopy line using any suitable method, such as a cleat, tie-off, clamp or the like.

The invention also lends itself to other generalized applications involving any flexible material. As can be appreciated, the novel concepts of the invention allow tension to be applied to effect alterations in the conformation of the material. Specifically, a gatherable tube or other attachment of the canopy line to the material allows such alteration of the conformation by adjusting the tension on the canopy line.

Described herein is a preferred embodiment, however, one skilled in the art that pertains to the present invention will understand that there are equivalent alternative embodiments.

What is claimed is:

1. An aerodynamic wing comprising a leading edge, a trailing edge, a flexible canopy forming a lifting surface, two steering lines attached to the kite adjacent to the trailing edge and an internally routed canopy line secured to the canopy configured so that changing tension of the canopy line alters the lifting surface, wherein the internally routed canopy line comprises at least one gatherable tube secured to the canopy, and wherein the canopy line is slidably disposed within the tube and wherein the canopy line is secured to at least one of the steering lines, so that change of tension can be transmitted to the canopy line by operation of the steering line.

2. The wing of claim 1, wherein the gatherable tube is disposed adjacent the trailing edge of the aerodynamic wing.

3. The wing of claim 1, wherein the canopy line is configured to allow a user to change tension while the wing is in flight.

4. The wing of claim 1, wherein the wing further comprises a front line attached to the kite adjacent the leading edge.

5. The wing of claim 4, wherein the front line is secured to the steering line, the front line is attached adjacent the leading edge by a front sliding point and the rear line is attached adjacent the trailing edge by a back sliding point, and the front line and steering line are routed through the front and rear sliding points.

6. The wing of claim 5, wherein movement of the front line is restricted by a pigtail extension secured at a first end adjacent the leading edge of the kite and secured at a second end to the front line.

7. The wing of claim 6, further comprising a locking element wherein movement of the front line and the steering line are restricted when tension is applied to the front line.

8. The wing of claim 1, wherein the wing comprises a leading edge inflatable kite.

9. The wing of claim 1, wherein the wing comprises a foil kite.

10. The wing of claim 1, wherein the gatherable tube is oriented substantially parallel to the leading edge.

11. The wing of claim 1, wherein the gatherable tube is oriented substantially perpendicular to the leading edge.

12. The wing of claim 1, comprising multiple gatherable tubes secured to different portions of the canopy.

13. The wing of claim 1, further comprising a tension adjuster disposed on the kite for changing the tension on the canopy line.

14. The wing of claim 1, further comprising a control bar having one or more lines extending to the wing, wherein operation of one or more of the lines changes tension in the canopy line.

15. A method for controlling an aerodynamic wing comprising the steps of:
   a) providing an aerodynamic wing comprising a leading edge, a trailing edge, a flexible canopy forming a lifting surface, a plurality of control lines secured to the wing and a canopy line internally routed through a gatherable tube secured to the canopy, wherein the canopy line is secured to one of the control lines; and
   b) changing tension in the canopy line to alter the lifting surface of the wing.

16. The method of claim 15, further comprising the step of providing a control bar secured to the control lines and wherein the step of changing tension in the canopy line comprises operating one or more of the control lines with the control bar.

* * * * *